J. CARR & G. S. BAKER.
SCRAP SEPARATING APPARATUS FOR DOUGH CUTTING AND SIMILAR MACHINES.
APPLICATION FILED FEB. 7, 1914.
1,224,600.  Patented May 1, 1917.
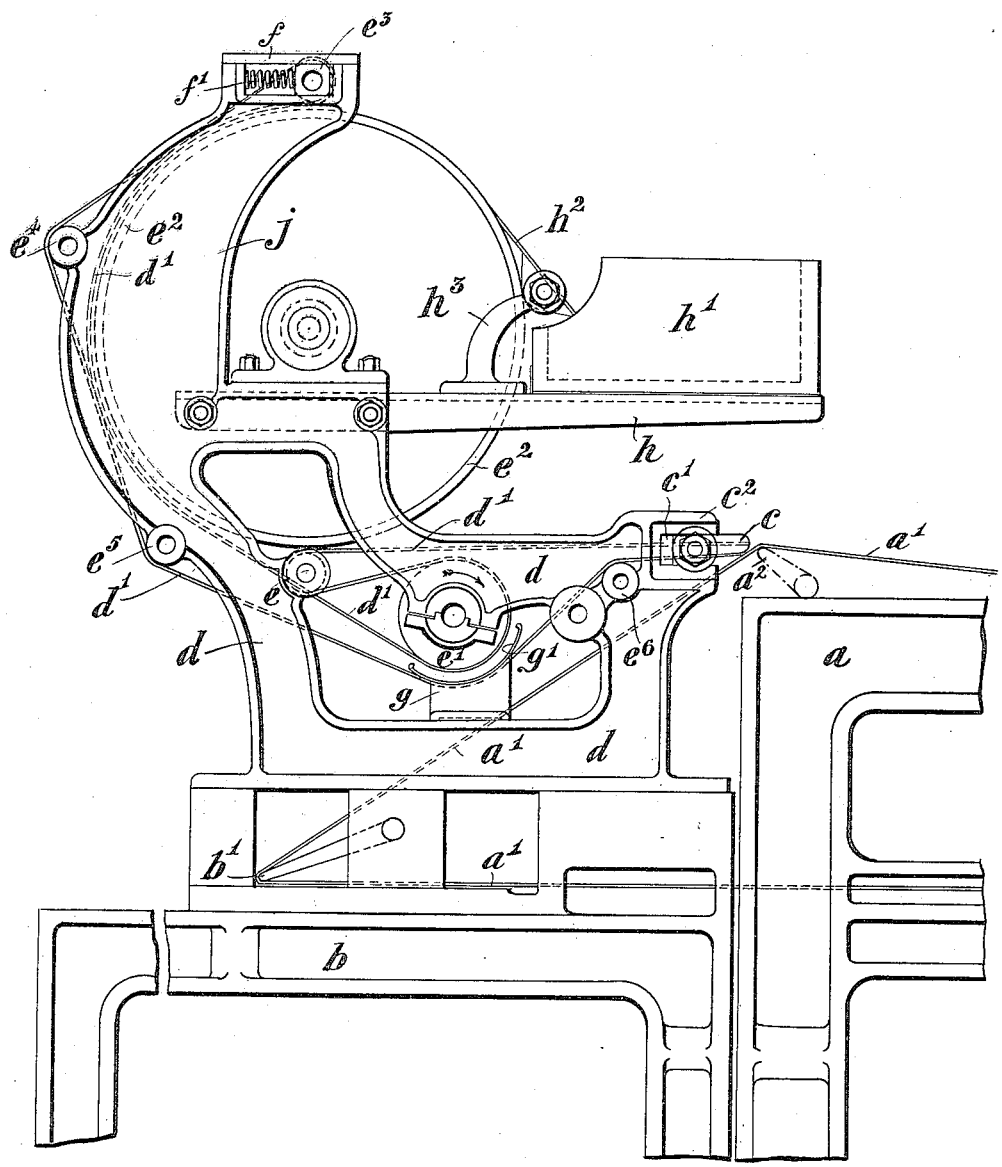
Witnesses.
C. A. Walter
W. A. Ginder
Inventors.
JOHN CARR & GEORGE SAMUEL BAKER.
by
their Attorney.

UNITED STATES PATENT OFFICE.

JOHN CARR AND GEORGE SAMUEL BAKER, OF LONDON, ENGLAND.

SCRAP-SEPARATING APPARATUS FOR DOUGH-CUTTING AND SIMILAR MACHINES.

1,224,600. Specification of Letters Patent. Patented May 1, 1917.

Application filed February 7, 1914. Serial No. 817,221.

*To all whom it may concern:*

Be it known that we, JOHN CARR and GEORGE SAMUEL BAKER, subjects of the King of England, both residing in London, in England, have invented certain new and useful Improvements in Scrap-Separating Apparatus for Dough - Cutting and Similar Machines, of which the following is a specification.

This invention relates to scrap separating apparatus for dough cutting and similar machines used for example in the manufacture of biscuits.

According to the present invention the dough is passed on a main web over a cutting table and the blanks cut while the dough is on said web, the latter then continuing directly to the point of separation of the blanks from the scrap and being deflected, while the scrap passes onto a second web, this construction rendering the apparatus very simple and insuring the correct or positive movement of the blanks which remain on the same web throughout the cutting and separating operations.

The invention further comprises means whereby the scrap is supported throughout its entire distance of travel from the point where it is separated from the biscuits to the point where it is collected, for example in a depositing receptacle, and to this end the web or equivalent which receives the scrap from the main web is adapted to convey said scrap between itself and the periphery of a revoluble drum for a certain distance after which the scrap is supported by said drum until collected therefrom.

The invention also comprises certain details of construction and arrangement of parts all as hereinafter fully described and pointed out in the appended claim.

The invention is illustrated in the accompanying drawing, which is a side elevation of an embodiment of the improved scrap separating apparatus applied to so much of a biscuit cutting machine as is necessary for comprehension of the invention.

In said drawing $a$ designates the cutting-table or frame of the machine and $b$ the panning-table or frame of a conventional form of biscuit machine. The dough travels along the main web $a^1$ which passes over the cutting table and then over a knife edge $a^2$ at the end of said table and about a similar knife edge $b^1$ adjacent the panning table, the web $a^1$ being given a suitable angle of inclination between said two knife edges to produce a more or less sharp downward deflection at the point $a^2$ where the scrap is separated from the biscuits. Adjacent said point of separation at a minimum distance therefrom to permit passage of the main web and the biscuits thereon is a third edge or equivalent $c$ adjustably mounted in bearings $c^1$ carried by standards or side frames $d$ shown as supported by the panning table and supporting all the elements of the scrap separating device proper. Passing about said edge $c$ which is preferably provided at each side with guides or flanges $c^2$, is a scrap supporting web $d^1$ which passes horizontally in or about the same plane as the main web $a^1$ and about a guide roller $e$, thence about a driving roller $e^1$ and from the latter partially around the periphery of a revoluble drum $e^2$ to the top thereof, thence about guide rollers $e^3$, $e^4$ $e^5$, the former of which is mounted to slide in bearings $f$ under the action of a web tensioning spring $f^1$, then from the guide roller $e^5$ through a guiding device comprising a block $g$ and spring plate $g^1$, and from the latter over a further guide roller $e^6$ back to its commencement at the knife edge $c$. Adjacent the drum $e^2$ at the side thereof opposite the web $d^1$, there is mounted on a bracket $h$ extending from the standards $d$ a scrap receiving receptacle $h^1$ into which the scrap is passed from the drum by a scraper $h^2$ mounted in arms $h^3$ supported by the bracket.

The action of the apparatus is as follows:—

The scrap, traveling along with the biscuits on the main web $a^1$ is carried, at the point adjacent the knife edges $a^2$ and $c$, horizontally or without appreciable deflection onto the web $d^1$ and is conveyed by the latter between itself and the periphery of the drum against which it is held by the portion of the web passing thereabout until it reaches the top of said drum, from which point it is supported by the drum itself until it reaches the scraper $h^2$ which deflects the scrap and allows same to accumulate in the receptacle $h^1$ from which it may be removed by any appropriate means.

Instead of the receptacle a traveling belt may be used to take away the scrap to a desired point.

That part of the drum about which the web passes is preferably partly inclosed by housings or casings $j$ forming parts of the standards or side frames $d$ and supporting the bearings for the guide rollers $e^3$ and $e^4$.

The scrap runs horizontally for a distance, and afterward is supported between the drum and the web and carried to a higher level, so that it can be collected and put in a receiver or carried elsewhere. It will be apparent that by having two or more rollers with a web passing over same, that the scrap might be carried away from the drum to a break or mixer as might be required.

It will thus be seen that the scrap is not liable to fracture at the point of separation from the biscuits owing to its movement in its initial plane when separated and having to traverse a gap of minimum width and that it is positively supported throughout the whole distance of its travel from the time of leaving the cutting table or equivalent to its final deposition in the collecting receptacle.

What we claim as our invention and desire to secure by Letters Patent of the United States is:—

In a scrap separating apparatus, the combination of a cutting table, a substantially horizontally disposed web passing over said table on which the blanks are cut from the material and on which said blanks and scrap travel together, means for downwardly deflecting said web at a point of its length to convey the blanks forward, a second web spaced only sufficiently from said first mentioned web to permit passage of the blanks at the point of deflection of said web, said second web receiving and conveying the scrap in a horizontal plane, a drum about the periphery of which the scrap receiving web passes to convey the scrap between said web and drum for a substantial portion of said periphery, the scrap being finally supported on the drum alone, a scraper for removing the scrap from said drum, and means for collecting the scrap removed by the scraper.

In witness whereof we have signed this specification in the presence of two witnesses.

JOHN CARR.
GEORGE SAMUEL BAKER.

Witnesses:
H. D. JAMESON,
O. J. WORTH.

Copies of this patent may be obtained for five cents each, by addressing the "Commissioner of Patents, Washington, D. C."